US008754610B2

(12) United States Patent
Garcia

(10) Patent No.: US 8,754,610 B2
(45) Date of Patent: Jun. 17, 2014

(54) SYSTEM AND METHOD FOR SUPPLYING POWER TO A LOAD

(75) Inventor: Jorge A. Garcia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 792 days.

(21) Appl. No.: 12/475,222

(22) Filed: May 29, 2009

(65) Prior Publication Data
US 2010/0295379 A1 Nov. 25, 2010

Related U.S. Application Data

(60) Provisional application No. 61/180,703, filed on May 22, 2009.

(51) Int. Cl.
*H02J 7/00* (2006.01)

(52) U.S. Cl.
USPC .......................................................... 320/110

(58) Field of Classification Search
USPC .......................................................... 320/110
See application file for complete search history.

(56) References Cited

U.S. PATENT DOCUMENTS

| 5,563,779 | A | | 10/1996 | Cave et al. | |
|---|---|---|---|---|---|
| 6,104,759 | A | * | 8/2000 | Carkner et al. | 307/31 |
| 7,200,052 | B2 | * | 4/2007 | Schreck | 365/189.09 |
| 2003/0052645 | A1 | * | 3/2003 | Sasaki | 320/110 |
| 2004/0155634 | A1 | * | 8/2004 | Sasaki | 323/263 |
| 2005/0194937 | A1 | * | 9/2005 | Jacobs | 320/135 |
| 2006/0266932 | A1 | * | 11/2006 | Machida et al. | 250/214 R |
| 2008/0079393 | A1 | * | 4/2008 | Spartano et al. | 320/110 |

FOREIGN PATENT DOCUMENTS

| EP | 0902547 A2 | 3/1999 |
|---|---|---|
| EP | 1445780 | 8/2004 |
| TW | 513847 B | 12/2002 |
| TW | 543263 B | 7/2003 |
| TW | I248052 B | 1/2006 |
| TW | I252390 B | 4/2006 |
| TW | I268046 B | 12/2006 |

OTHER PUBLICATIONS

International Search Report and Written Opinion—PCT/US2010/033676, International Search Authority—European Patent Office—Aug. 3, 2010.
Taiwan Search Report—TW099115007—TIPO—Jul. 7, 2013.

* cited by examiner

*Primary Examiner* — Edward Tso
*Assistant Examiner* — Robert Grant
(74) *Attorney, Agent, or Firm* — Paul S. Holdaway

(57) ABSTRACT

An apparatus for supplying power to a bursty or highly dynamic load. The apparatus includes a first circuit for supplying charge to the load at a first voltage, and a second circuit for replenishing the charge depleted from the first circuit, wherein the second circuit is charged at a second voltage greater than the first voltage in order to achieve a defined rate of charge replenishment. The apparatus may include a feedback network for controlling the voltage applied to the load in response to process and temperature variations. The feedback network may regulate the charge capacity of the second circuit, the resistance between the first and second circuits, the duration of the charge replenishment, or the second voltage in which the second circuit is charged.

42 Claims, 8 Drawing Sheets

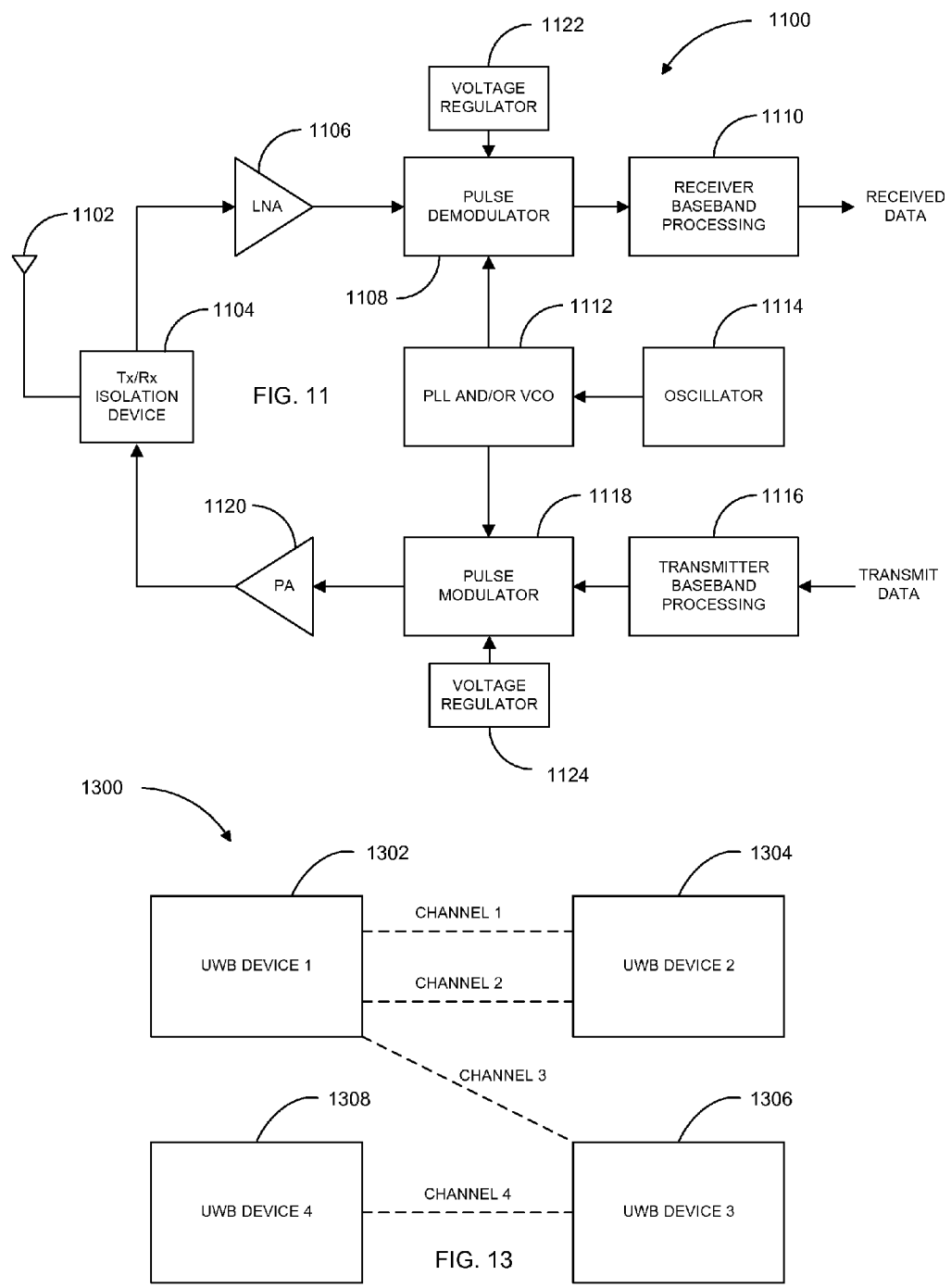

SYSTEM AND METHOD FOR SUPPLYING POWER TO A LOAD

CROSS REFERENCE TO A RELATED APPLICATION

This application claims the benefit of the filing date of Provisional Patent Application, Ser. No. 61/180,703, filed on May 22, 2009, and entitled "System and Method for Supplying Power to a Load," which is incorporated herein by reference.

FIELD

The present disclosure relates generally to power supplying systems, and more specifically, to a system and method for supplying power to a highly-dynamic or bursty load.

BACKGROUND

The bursty nature of highly dynamic loads causes current demands on a power regulator to go, for example, from a few micro Amps (μA) to tens of milli Amps (mA) within a short period of time (e.g., in the order of 3 nanoseconds (ns) for the case of an ultra wideband (UWB) application). Moreover, the power regulator has to recover from the initial burst and be ready for the next burst within a very short period (e.g., 10-20 ns for a pulse position UWB system). Along with this rapidly changing load requirement, there are load regulation specifications that typically restrict the maximum voltage ripple across the load to values below a few tens of milli Volts (mV).

The dynamic requirements typically associated with bursty load operations generally preclude the use of conventional voltage regulation schemes, such as Low Drop Out (LDO) regulators or Switch-Mode Power Supplies (SMPS) which, due to their inherent feedback regulation schemes and relatively low bandwidth, typically cannot react fast enough to the rapid changes of the load profile. As a consequence, one of the regulation aspects is invariably compromised: the ripple voltage, the regulation capabilities, or the regulation capacitance size, which may become undesirably large.

The current solutions to tackle this type of requirements are generally ineffective in solving the problem. For example, the use of an LDO regulator for regulation of such a bursty supply would be difficult for the reason that the loop is not fast enough to regulate the supply within a very short time period (e.g., 12.5 ns). Moreover, the stringent requirements on the maximum droop tolerated generally requires a huge bypass capacitor. Furthermore, the loop bandwidth of the LDO is limited by the stability requirement and an LDO with a few ns response is difficult to realize.

SUMMARY

An aspect of the disclosure relates to an apparatus for supplying power to a load. The apparatus comprises a first circuit adapted to transfer charge at a first voltage to the load, and a second circuit adapted to replenish the charge depleted from the first circuit, wherein the second circuit is charged at a second voltage greater than the first voltage so as to achieve a defined rate of charge replenishment. In another aspect, the first circuit comprises a capacitive element. In yet another aspect, the capacitive element includes a capacitance sufficient to maintain the first voltage within a defined specification. In another aspect of the disclosure, the second circuit comprises a capacitive element. In yet another aspect, the apparatus further comprises a compensator adapted to change a capacitance of the capacitive element as a function of the first voltage. In still another aspect, the capacitance element includes a capacitance that is sufficient to substantially replenish all the charge depleted from the first circuit.

In another aspect of the disclosure, the apparatus further comprises a compensator adapted to control an amount of charge transferred from the second circuit to the first circuit to maintain the first voltage within a defined specification. In yet another aspect, the first circuit comprises an energy storage element. In still another aspect, the energy storage element comprises an inductive element. In even another aspect, the first circuit comprises a first capacitive element including a first capacitance, and the second circuit comprises a second capacitance element including a second capacitance, wherein the first capacitance is greater than the second capacitance.

In another aspect of the disclosure, the apparatus further comprises a controller adapted to establish a defined timing relationship between the transfer of the charge from the first circuit to the load, and the replenishment of the charge depleted from the first circuit. In still another aspect, the controller is adapted to transfer the charge from the first circuit to the load at substantially the same time interval as the replenishment of the charge depleted from the first circuit. In still another aspect, the controller is adapted to transfer the charge from the first circuit to the load at a different time interval as the replenishment of the charge depleted from the first circuit.

Other aspects, advantages and novel features of the present disclosure will become apparent from the following detailed description of the disclosure when considered in conjunction with the accompanying drawings.

BRIEF DESCRIPTION OF THE DRAWINGS

FIG. 11 illustrates a block diagram of an exemplary communication system in accordance with another aspect of the disclosure.

FIG. 13 illustrates a block diagram of various communications devices communicating with each other via various channels in accordance with another aspect of the disclosure.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Figure 1A:
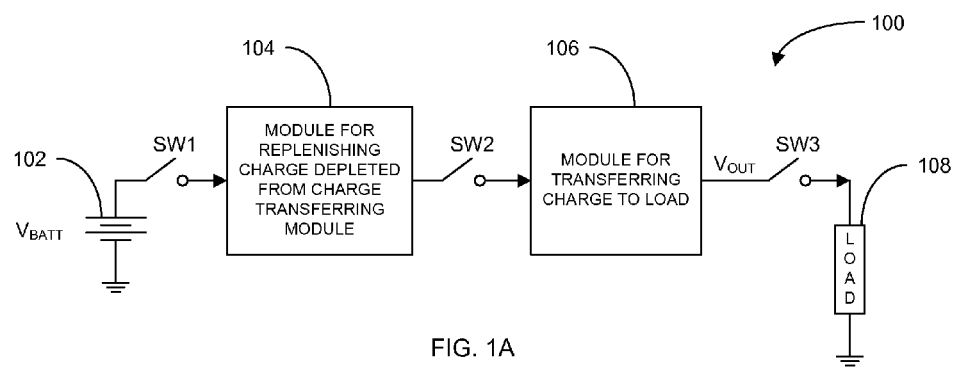
FIG. 1A illustrates a block diagram of an exemplary apparatus for supplying power to a load in accordance with an aspect of the disclosure.

FIG. 1A illustrates a block diagram of an exemplary apparatus 100 for supplying power to a load in accordance with an aspect of the disclosure. In summary, the apparatus 100 includes a first module for transferring charge to a bursty or highly dynamic load when it needs it, and a second module for replenishing the charge depleted from the first module. Thus, the apparatus 100 uses pre-knowledge of when the load needs the charge in order to meet the bursty demand, and also uses this pre-knowledge to replenish the charge depleted at a time when the load is not needing the charge.

In particular, the apparatus 100 comprises a voltage source 102 (e.g., a battery), a first switching element SW1, a module 104 for replenishing charge, a second switching element SW2, a module 106 for transferring charge to a load 108, and a third switching element SW3. The voltage source 102 provides a voltage $V_{BATT}$ to the charge replenishing module 104 when the first switching element SW1 is turned ON or closed. The charge replenishing module 104 uses the voltage $V_{BATT}$ in order to form charge for replenishing purposes.

The charge replenishing module 104 replenishes charge depleted from the charge transferring module 106 when the second switching element SW2 is turned ON or closed. The charge transferring module 106, in turn, uses the replenished charge to supply it to the load 108 when the third switching element SW3 is turned ON or closed. In order to meet the load's demands for charge, perform the specified charge transfer and replenishment, and form the original charge, the apparatus 100 may operate the switching elements SW1-3 in a defined timing relationship as discussed in more detail below.

Figure 1B:
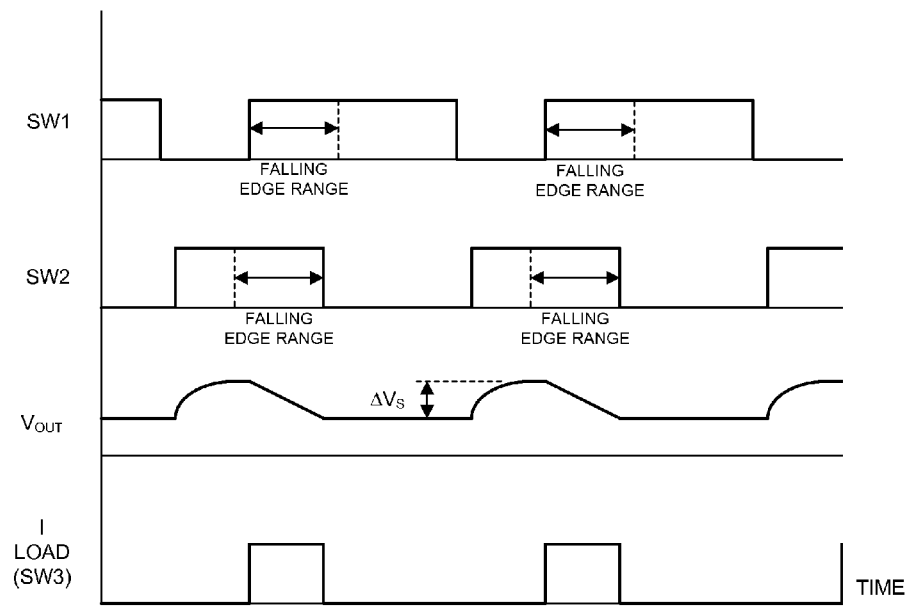
FIG. 1B illustrates a timing diagram of exemplary operations performed by the apparatus for supplying power to a load in accordance with another aspect of the disclosure.

FIG. 1B illustrates a timing diagram of exemplary operations performed by the apparatus 100 for supplying power to the load 108 in accordance with another aspect of the disclosure. The timing diagram includes the timing response of four (4) parameters: the turning ON (close position) and OFF (open position) of the first switching element SW1, the turning ON and OFF of the second switching element SW2, the voltage $V_{OUT}$ at the output of the charge transferring module 106, and the load current, which corresponds to the turning ON and OFF of the third switching element SW3. With regard to the switching elements SW1-3, the high level in the response indicates the corresponding switching element is ON, and the low level in the response indicates the corresponding switching element is OFF.

In operation, according to the timing diagram, prior to or during the time when the load 108 needs the charge, the first switching element SW1 is turned ON in order to form charge in the charge replenishing module 104. After sufficient time to create the necessary charge in the charge replenishing module 104, the first switching element SW1 is turned OFF, and the second switching element SW2 is turned ON so that charge replenishing module 104 may replenish charge depleted from the charge transferring module 106 during a previous cycle of supplying charge to the load 108.

When charge is being replenished in the charge transferring module 106, the voltage $V_{OUT}$ increases to a maximum value that depends on the charge capacity of the charge transferring module 106. As noted in the diagram, the second switching element SW2 may be turned OFF substantially when the voltage $V_{OUT}$ reaches the maximum value. The third switching element SW3 is then turned ON so that the charge transferring module 106 transfers the charge to the load 108. As noted in the diagram, the voltage $V_{OUT}$ decreases to substantially its original level due to the load's consumption of the charge. The difference in the maximum and minimum of the voltage $V_{OUT}$ represents the ripple $\Delta V_S$ in the load voltage.

Substantially coincidental with the turning ON of the third switching element SW3, the first switching element SW1 may be turned ON in order to form charge in the charge replenishing module 104 for the next cycle of supplying charge to the load 108. This cycle, as discussed above, may be repeated for subsequent demands for charge by the load 108.

Also, as noted in the diagram, the second switching element SW2 may be turned OFF any time between the maximum and minimum of the voltage $V_{OUT}$. Note, that in such a case, both the second and third switching elements SW2 and SW3 are turned ON at the same time, thus coupling the charge replenishing module 104 to the load 108 in order to assist the charge transferring module 106 in delivering the charge to the load. Similarly, the first switching element SW1 may be turned ON any time between the turning ON and OFF of the third switching element SW3. In this way, the voltage source 102 also assists the charge replenishing module 104 and the charge transferring module 106 in delivering the charge to the load 108.

Figure 1C:
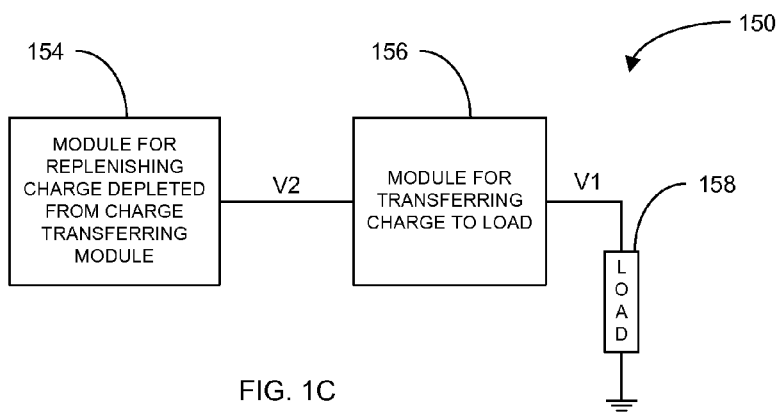
FIG. 1C illustrates a block diagram of another exemplary apparatus for supplying power to a load in accordance with another aspect of the disclosure.

FIG. 1C illustrates a block diagram of an exemplary apparatus 150 for supplying power to a load in accordance with another aspect of the disclosure. The apparatus 150 may be a more general implementation of the apparatus 100 previously discussed. The apparatus 150 comprises a module 156 for transferring charge to a load 158 at a first voltage V1, and a module 154 for replenishing charge depleted from charge transferring module 156. The charge replenishing module 154 is charged at a second voltage V2 that is greater than the first voltage V1 so as to achieve a defined rate of charge replenishment.

Figure 2:
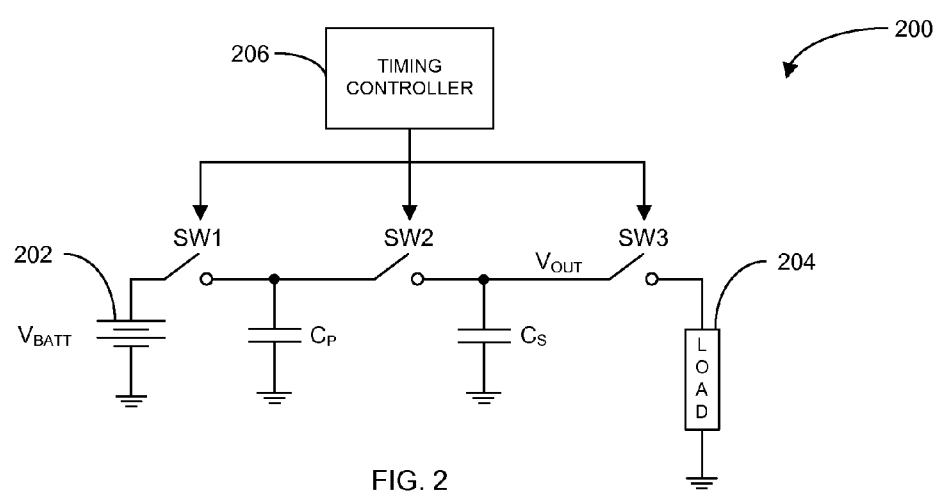
FIG. 2 illustrates a block diagram of another exemplary apparatus for supplying power to a load in accordance with another aspect of the disclosure.

FIG. 2 illustrates a block diagram of another exemplary apparatus 200 for supplying power to a load 204 in accordance with another aspect of the disclosure. In summary, the apparatus 200 may be a more detailed implementation of the apparatus 100 previously discussed. The apparatus 200 comprises a voltage source 202 (e.g., a battery), a first switching element SW1, a first capacitive element $C_P$, a second switching element SW2, a second capacitive element $C_S$, a third switching element SW3, and a timing controller 206.

In this example, the second capacitive element $C_S$ is an example of a module or circuit for transferring charge to the load 204. The first capacitive element $C_P$ is an example of a module or circuit for replenishing the charge depleted from the second capacitive element $C_S$. The capacitance of the first capacitive element $C_P$ is sufficient to replenish substantially all the charge depleted from the second capacitive element $C_S$. This may entail that the capacitance of the first capacitive element $C_P$ is greater than the capacitance of the second capacitive element $C_S$.

The voltage source 202 provides a voltage $V_{BATT}$ across the first capacitive element $C_P$ when the first switching element SW1 is turned ON in order to form charge on the first capacitive element $C_P$, as previously discussed with reference to apparatus 100. The timing controller 206 operates the turning ON and OFF of the switching elements SW1-3 to perform the forming of charge on the first capacitive element $C_P$ (e.g., by turning ON SW1), the replenishment of charge depleted from the second capacitive element $C_S$ (e.g., by turning ON SW2), and the transfer of charge to the load 204 (e.g., by turning ON SW3), per, for example, the timing relationship as depicted in FIG. 1B.

Figure 3:
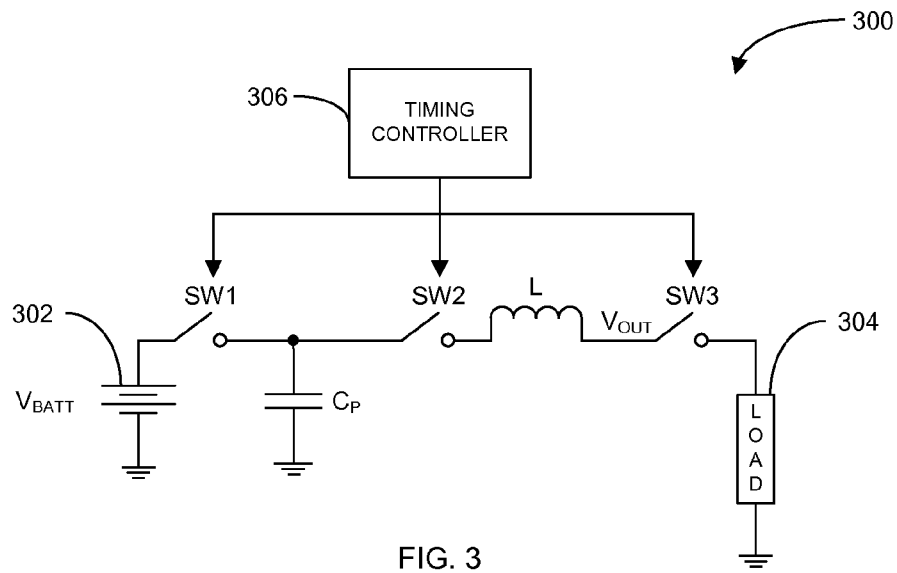
FIG. 3 illustrates a block diagram of another exemplary apparatus for supplying power to a load in accordance with another aspect of the disclosure.

FIG. 3 illustrates a block diagram of another exemplary apparatus 300 for supplying power to a load 304 in accordance with another aspect of the disclosure. In summary, the apparatus 300 includes an inductive element, instead of a capacitive element, as the module or circuit for transferring charge to a load. In particular, the apparatus 300 comprises a voltage source 302 (e.g., a battery), a first switching element SW1, a capacitive element $C_P$, a second switching element SW2, an inductive element L, a third switching element SW3, and a timing controller 306.

In this example, the inductive element L is an example of a module or circuit for transferring charge to the load 304. The capacitive element $C_P$ is an example of a module or circuit for replenishing the charge depleted from the inductive element L. The voltage source 302 provides a voltage $V_{BATT}$ across the capacitive element $C_P$ when the first switching element SW1 is turned ON in order to form charge on the capacitive element $C_P$. The timing controller 306 operates the turning ON and Off of the switching elements SW1-3 to perform the forming of charge on the first capacitive element $C_P$ (e.g., by turning ON SW1), the replenishment of charge depleted from the inductive element L (e.g., by turning ON SW2), and the transfer of charge to the load 304 (e.g., by turning ON SW3), per, for example, the timing relationship as depicted in FIG. 1B.

Figure 4:
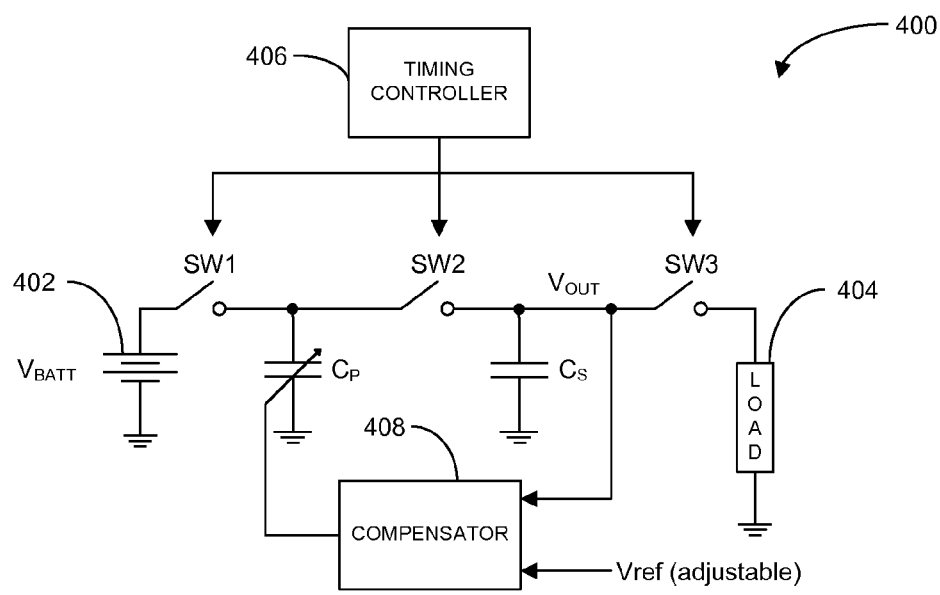
FIG. 4 illustrates a block diagram of another exemplary apparatus for supplying power to a load in accordance with another aspect of the disclosure.

FIG. 4 illustrates a block diagram of another exemplary apparatus 400 for supplying power to a load 404 in accordance with another aspect of the disclosure. In summary, the apparatus 400 is similar to the apparatus 200, except that it further includes a feedback network to compensate the load voltage $V_{OUT}$ for variation in process and temperature. The apparatus 400 comprises a voltage source 402 (e.g., a battery), a first switching element SW1, a first capacitive element $C_P$, a second switching element SW2, a second capacitive element $C_S$, a third switching element SW3, a timing controller 406, and a compensator 408.

Similar to apparatus 200, the second capacitive element $C_S$ is an example of a module or circuit for transferring charge to the load 404. The first capacitive element $C_P$ is an example of a module or circuit for replenishing the charge depleted from the second capacitive element $C_S$. The voltage source 402 provides a voltage $V_{BATT}$ across the first capacitive element $C_P$ when the first switching element SW1 is turned ON in order to form charge on the first capacitive element $C_P$. The timing controller 406 operates the turning ON and OFF of the switching elements SW1-3 to perform the forming of charge on the first capacitive element $C_P$ (e.g., by turning ON SW1), the replenishment of charge depleted from the second capacitive element $C_S$ (e.g., by turning ON SW2), and the transfer of charge to the load 404 (e.g., by turning ON SW3), per, for example, the timing relationship as depicted in FIG. 1B.

In general, the amount of charge needed to replenish the charge depleted from the second capacitive element $C_S$ depends on the voltage source 402, the capacitance of the first capacitance element $C_P$, the amount of time that the first and second switching elements are turned ON, the resistances of the first and second switching elements SW1 and SW2 (which, for example, may be implemented as MOSFETs), and other factors. Many, if not all, of these components depend on process and temperature variations. Thus, if not corrected, the voltage $V_{OUT}$ across the load 404 will vary with process and temperature variations. This variation $V_{OUT}$ may lead to undesirable affects, and thus usually tight specifications are dictated.

Accordingly, to maintain the voltage $V_{OUT}$ within a defined specification, a control feedback network is provided in the apparatus 400. In particular, the control feedback network includes the compensator 408 having a first input adapted to receive the voltage $V_{OUT}$, a second input adapted to receive a reference voltage Vref, which could be adjustable in order to set the voltage $V_{OUT}$ at a defined range, and an output to control the capacitance of the first capacitance element $C_P$, which, in this example, is a variable capacitor. The compensator 408 generates the capacitance control signal based on the voltage $V_{OUT}$ and the reference voltage Vref in order to maintain $V_{OUT}$ within a defined range.

Figure 5:
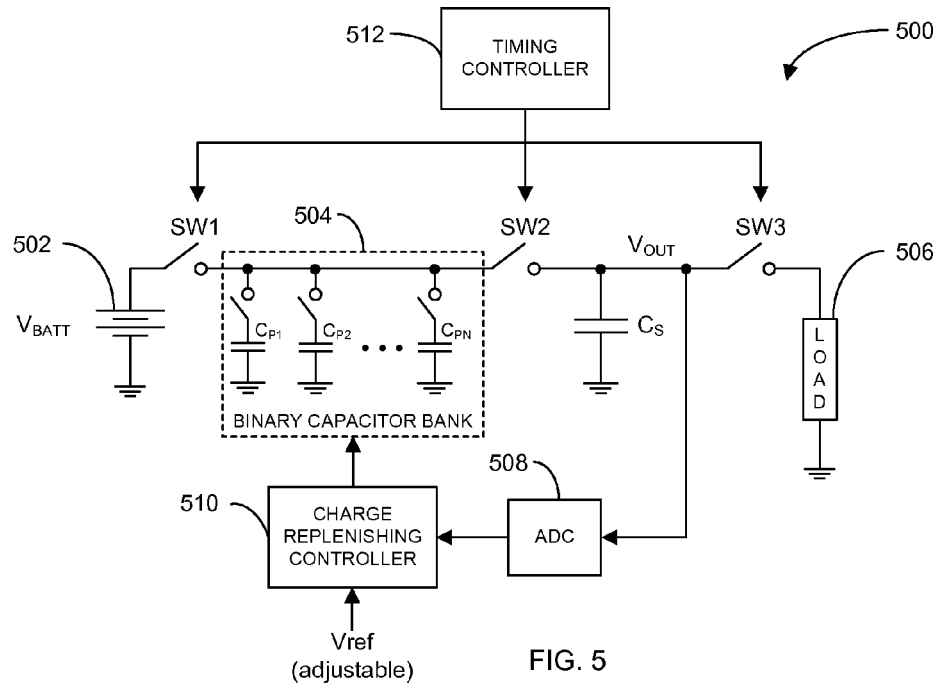
FIG. 5 illustrates a block diagram of another exemplary apparatus for supplying power to a load in accordance with another aspect of the disclosure.

FIG. 5 illustrates a block diagram of another exemplary apparatus 500 for supplying power to a load 506 in accordance with another aspect of the disclosure. In summary, the apparatus 500 is an example of a digital implementation of the general apparatus 400. That is, the apparatus 500 includes a digital feedback network to compensate the load voltage $V_{OUT}$ for variation in process and temperature.

In particular, the apparatus 500 comprises a voltage source 502 (e.g., a battery), a first switching element SW1, a binary capacitor bank 504, a second switching element SW2, a capacitive element $C_S$, a third switching element SW3, a timing controller 512, an analog-to-digital converter (ADC) 508, and a charge replenishing controller 510. The capacitive element $C_S$ is an example of a module or circuit for transferring charge to the load 506. The binary capacitor bank 504 is an example of a module or circuit for replenishing the charge depleted from the capacitive element $C_S$. The voltage source 502 provides a voltage $V_{BATT}$ across the binary capacitor bank 504 when the first switching element SW1 is turned ON in order to form charge on the capacitor bank. The timing controller 512 operates the turning ON and OFF of the switching elements SW1-3 to perform the forming of charge on the binary capacitor bank 504 (e.g., by turning ON SW1), the replenishment of charge depleted from the capacitive element $C_S$ (e.g., by turning ON SW2), and the transfer of charge to the load 506 (e.g., by turning ON SW3), per, for example, the timing relationship as depicted in FIG. 1B.

Accordingly, to maintain the voltage $V_{OUT}$ within a defined specification in response to process and/or temperature variation, a digital control feedback network is provided in the apparatus 500. In particular, the digital feedback network includes the ADC 508 to convert the voltage $V_{OUT}$ into a digital value, and the charge replenishing controller 510 to turn ON and OFF the appropriate binary capacitors $C_{P1}$ to $C_{PN}$ of the capacitor bank 504 based on the digital value outputted by the ADC 508 in order to maintain $V_{OUT}$ within a defined range.

Figure 6:
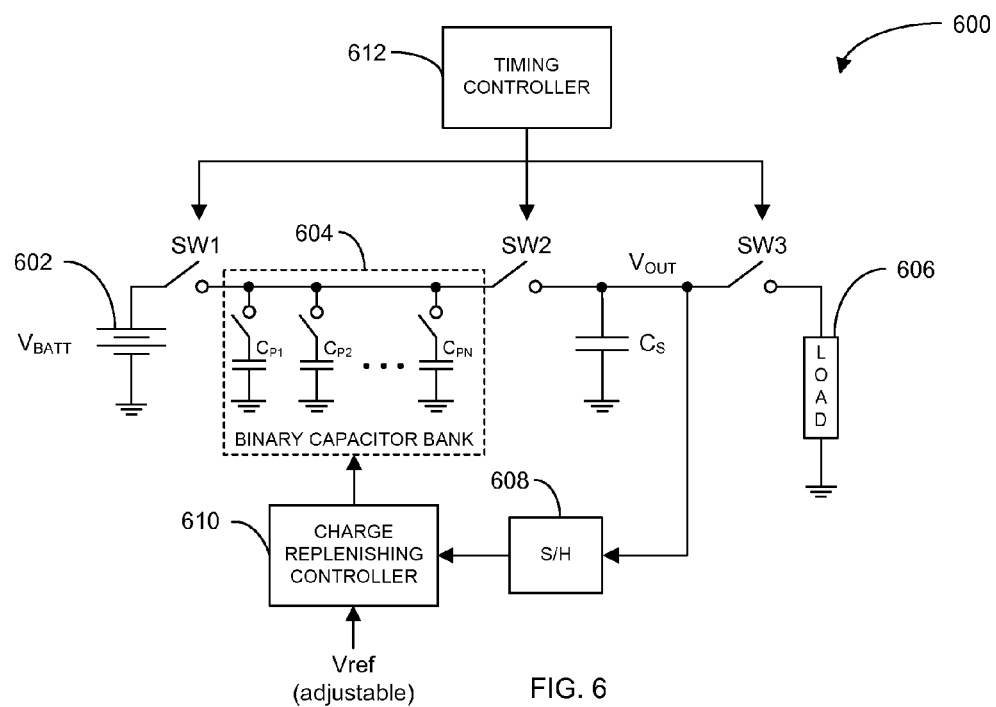
FIG. 6 illustrates a block diagram of another exemplary apparatus for supplying power to a load in accordance with another aspect of the disclosure.

FIG. 6 illustrates a block diagram of another exemplary apparatus 600 for supplying power to a load 604 in accordance with another aspect of the disclosure. In summary, the apparatus 600 is an example of a mixed analog and digital implementation of the general apparatus 400. That is, the apparatus 600 includes a partially analog and partially digital feedback network to compensate the load voltage $V_{OUT}$ for variation in process and temperature.

In particular, the apparatus 600 comprises a voltage source 602 (e.g., a battery), a first switching element SW1, a binary capacitor bank 604, a second switching element SW2, a capacitive element $C_S$, a third switching element SW3, a timing controller 612, a sample-and-hold (S/H) 608, and a charge replenishing controller 610. The capacitive element $C_S$ is an example of a module or circuit for transferring charge to the load 606.

The binary capacitor bank 604 is an example of a module or circuit for replenishing the charge depleted from the capacitive element $C_S$. The voltage source 602 provides a voltage $V_{BATT}$ across the binary capacitor bank 604 when the first switching element SW1 is turned ON in order to form charge on the capacitor bank. The timing controller 612 operates the turning ON and OFF of the switching elements SW1-3 to perform the forming of charge on the binary capacitor bank 604 (e.g., by turning ON SW1), the replenishment of charge depleted from the capacitive element $C_S$ (e.g., by turning ON SW2), and the transfer of charge to the load 606 (e.g., by turning ON SW3), per, for example, the timing relationship as depicted in FIG. 1B.

Accordingly, to maintain the voltage $V_{OUT}$ within a defined specification in response to process and/or temperature variation, a mixed analog and digital control feedback network is provided in the apparatus 600. In particular, the feedback network includes the S/H 608 to generate an analog sample-in-time of the voltage $V_{OUT}$, and the charge replenishing controller 610 to turn ON and OFF the appropriate binary capacitors $C_{P1}$ to $C_{PN}$ of the capacitor bank 604 based on the analog sample from the S/H 608 in order to maintain $V_{OUT}$ within a defined range.

Figure 7:
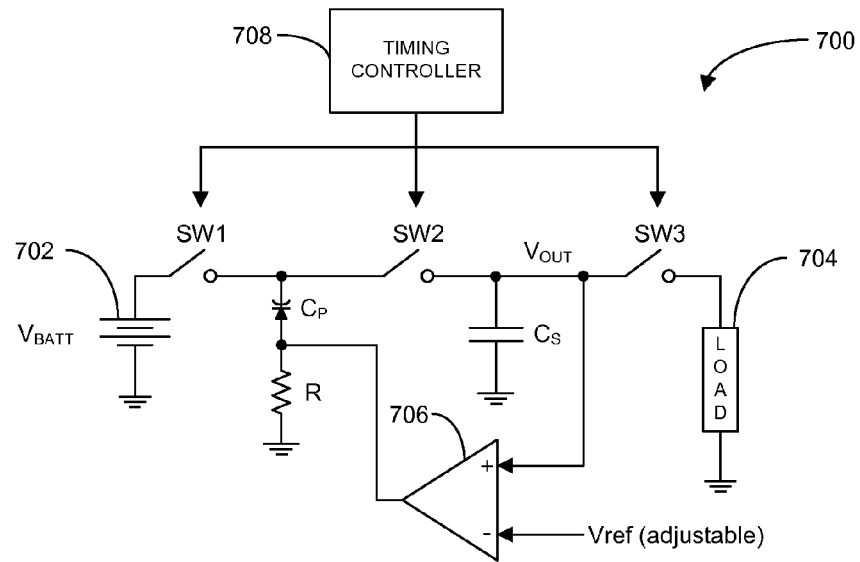
FIG. 7 illustrates a block diagram of another exemplary apparatus for supplying power to a load in accordance with another aspect of the disclosure.

FIG. 7 illustrates a block diagram of another exemplary apparatus 700 for supplying power to a load 704 in accordance with another aspect of the disclosure. In summary, the apparatus 700 is an example of an analog implementation of the general apparatus 400. That is, the apparatus 700 includes an analog feedback network to compensate the load voltage $V_{OUT}$ for variation in process and temperature.

In particular, the apparatus 700 comprises a voltage source 702 (e.g., a battery), a first switching element SW1, a varactor $C_P$ with a bias resistor R, a second switching element SW2, a capacitive element $C_S$, a third switching element SW3, a timing controller 708, and a differential amplifier 706. The capacitive element $C_S$ is an example of a module or circuit for transferring charge to the load 704. The varactor $C_P$ is an example of a module or circuit for replenishing the charge depleted from the capacitive element $C_S$. The voltage source 702 provides a voltage $V_{BATT}$ across the varactor $C_P$ when the first switching element SW1 is turned ON in order to form charge on the varactor. The timing controller 708 operates the turning ON and OFF of the switching elements SW1-3 to perform the forming of charge on the varactor $C_P$ (e.g., by turning ON SW1), the replenishment of charge depleted from the capacitive element $C_S$ (e.g., by turning ON SW2), and the transfer of charge to the load 704 (e.g., by turning ON SW3), per, for example, the timing relationship as depicted in FIG. 1B.

Accordingly, to maintain the voltage $V_{OUT}$ within a defined specification in response to process and/or temperature variation, an analog control feedback network is provided in the apparatus 700. In particular, the analog feedback network includes the differential amplifier 706 including a first input (+) to receive the voltage $V_{OUT}$, a second input (−) to receive a reference voltage Vref, which may be adjustable, and an output coupled to the varactor $C_P$. The differential amplifier 706 generates a signal to control the capacitance of the varactor $C_P$ based on the voltage $V_{OUT}$ and the reference voltage Vref in order to maintain $V_{OUT}$ within a defined range.

Figure 8:
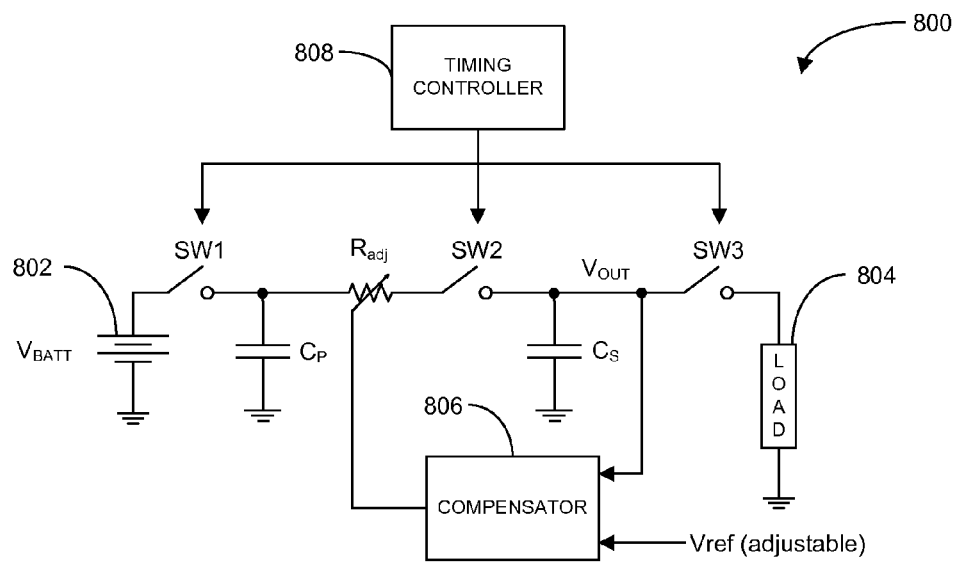
FIG. 8 illustrates a block diagram of another exemplary apparatus for supplying power to a load in accordance with another aspect of the disclosure.

FIG. 8 illustrates a block diagram of another exemplary apparatus 800 for supplying power to a load 804 in accordance with another aspect of the disclosure. In the previous examples, the control feedback network adjusted the capacitance of the charge replenishing module or circuit in response to the voltage $V_{OUT}$ in order to maintain $V_{OUT}$ within a defined range in response to process and/or temperature variations. However, the capacitance of the charge replenishing module or circuit is not the only parameter that may be adjusted to maintain $V_{OUT}$ within a defined range. For instance, in apparatus 800, the resistance between a charge replenishing module and a charge transferring module is adjusted to maintain $V_{OUT}$ within a defined range.

In particular, the apparatus 800 comprises a voltage source 802 (e.g., a battery), a first switching element SW1, a first capacitive element $C_P$, an adjustable resistive element $R_{adj}$, a second switching element SW2, a second capacitive element $C_S$, a third switching element SW3, a timing controller 808, and a compensator 806. The second capacitive element $C_S$ is an example of a module or circuit for transferring charge to the load 804. The first capacitive element $C_P$ is an example of a module or circuit for replenishing the charge depleted from the capacitive element $C_S$. The voltage source 802 provides a voltage $V_{BATT}$ across the first capacitive element $C_P$ when the first switching element SW1 is turned ON in order to form charge on the first capacitive element $C_P$. The timing controller 808 operates the turning ON and OFF of the switching elements SW1-3 to perform the forming of charge on the first capacitive element $C_P$ (e.g., by turning ON SW1), the replenishment of charge depleted from the capacitive element $C_S$ (e.g., by turning ON SW2), and the transfer of charge to the load 804 (e.g., by turning ON SW3), per, for example, the timing relationship as depicted in FIG. 1B.

Accordingly, to maintain the voltage $V_{OUT}$ within a defined specification in response to process and/or temperature variation, a control feedback network is provided in the apparatus 800. In particular, the control feedback network includes the compensator 806 having a first input adapted to receive the voltage $V_{OUT}$, a second input adapted to receive a reference voltage Vref, which could be adjustable in order to set the voltage $V_{OUT}$ at a defined range, and an output to control the resistance of the adjustable resistive element $R_{adj}$. The compensator 808 generates the resistance control signal based on the voltage $V_{OUT}$ and the reference voltage Vref in order to maintain $V_{OUT}$ within a defined range. It shall be understood that the adjustable resistive element $R_{adj}$ and the second switching element SW2 may be one in the same as, for example, a MOSFET or similar device.

Figure 9:
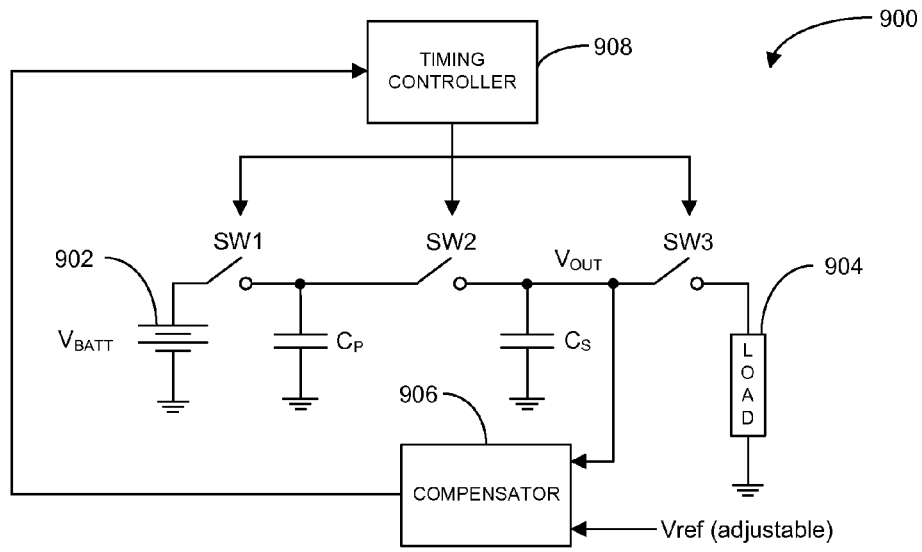
FIG. 9 illustrates a block diagram of another exemplary apparatus for supplying power to a load in accordance with another aspect of the disclosure.

FIG. 9 illustrates a block diagram of another exemplary apparatus 900 for supplying power to a load 904 in accordance with another aspect of the disclosure. In the previous example, the control feedback network adjusted the resistance between the charge replenishing module or circuit and the charge transferring module or circuit to maintain $V_{OUT}$ within a defined range. In the case of apparatus 900, the control feedback network adjusts the duration in which the second switching element SW2 is turned ON in order to maintain $V_{OUT}$ within a defined range.

In particular, the apparatus 900 comprises a voltage source 902 (e.g., a battery), a first switching element SW1, a first capacitive element $C_P$, a second switching element SW2, a second capacitive element $C_S$, a third switching element SW3, a timing controller 908, and a compensator 906. The second capacitive element $C_S$ is an example of a module or circuit for transferring charge to the load 904. The first capacitive element $C_P$ is an example of a module or circuit for replenishing the charge depleted from the capacitive element $C_S$. The voltage source 902 provides a voltage $V_{BATT}$ across the first capacitive element $C_P$ when the first switching element SW1 is turned ON in order to form charge on the first capacitive element $C_P$. The timing controller 908 operates the turning ON and OFF of the switching elements SW1-3 to perform the forming of charge on the first capacitive element $C_P$ (e.g., by turning ON SW1), the replenishment of charge depleted from the second capacitive element $C_S$ (e.g., by turning ON SW2), and the transfer of charge to the load 904 (e.g., by turning ON SW3), per, for example, the timing relationship as depicted in FIG. 1B.

Accordingly, to maintain the voltage $V_{OUT}$ within a defined specification in response to process and/or temperature variation, a control feedback network is provided in the apparatus 900. In particular, the control feedback network includes the compensator 906 having a first input adapted to receive the voltage $V_{OUT}$, a second input adapted to receive a reference voltage Vref, which could be adjustable in order to set the voltage $V_{OUT}$ at a defined range, and an output coupled to the timing controller 908. The compensator 906 generates a timing control signal that controls the duration of the ON time of the second switching element SW2 based on the voltage $V_{OUT}$ and the reference voltage Vref in order to maintain $V_{OUT}$ within a defined range.

Figure 10:
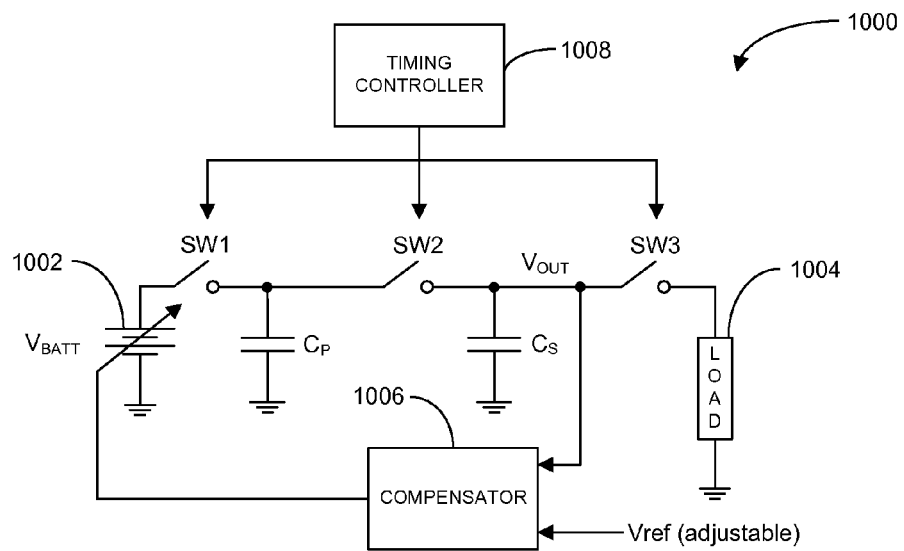
FIG. 10 illustrates a block diagram of another exemplary apparatus for supplying power to a load in accordance with another aspect of the disclosure.

FIG. 10 illustrates a block diagram of another exemplary apparatus 1000 for supplying power to a load 1004 in accordance with another aspect of the disclosure. In the previous example, the control feedback network adjusted the duration in which the second switching element SW2 is turned ON to maintain $V_{OUT}$ within a defined range. In the case of apparatus 1000, the control feedback network adjusts the voltage $V_{BATT}$ produced by a voltage source to maintain $V_{OUT}$ within a defined range.

In particular, the apparatus 1000 comprises a voltage source 1002 (e.g., a battery), a first switching element SW1, a first capacitive element $C_P$, a second switching element SW2, a second capacitive element $C_S$, a third switching element SW3, a timing controller 1008, and a compensator 1006. The second capacitive element $C_S$ is an example of a module or circuit for transferring charge to the load 1004. The first capacitive element $C_P$ is an example of a module or circuit for replenishing the charge depleted from the capacitive element $C_S$. The voltage source 1002 provides a voltage $V_{BATT}$ across the first capacitive element $C_P$ when the first switching element SW1 is turned ON in order to form charge on the first capacitive element $C_P$. The timing controller 1008 operates the turning ON and OFF of the switching elements SW1-3 to perform the forming of charge on the first capacitive element $C_P$ (e.g., by turning ON SW1), the replenishment of charge depleted from the second capacitive element $C_S$ (e.g., by turning ON SW2), and the transfer of charge to the load 1004 (e.g., by turning ON SW3), per, for example, the timing relationship as depicted in FIG. 1B.

Accordingly, to maintain the voltage $V_{OUT}$ within a defined specification in response to process and/or temperature variation, a control feedback network is provided in the apparatus 1000. In particular, the control feedback network includes the compensator 1008 having a first input adapted to receive the voltage $V_{OUT}$, a second input adapted to receive a reference voltage Vref, which could be adjustable in order to set the voltage $V_{OUT}$ at a defined range, and an output coupled to the voltage source 1002. The compensator 1006 generates a voltage control signal that controls the voltage $V_{BATT}$ generated by the voltage source 1002 based on the voltage $V_{OUT}$ and the reference voltage Vref in order to maintain $V_{OUT}$ within a defined range.

FIG. 11 illustrates a block diagram of an exemplary communication device 1100 in accordance with another aspect of the disclosure. The communication device 1100 may be one exemplary implementation of a communication device that uses any of the apparatuses previously discussed as a voltage regulator. In particular, the communications device 1100 comprises an antenna 1102, a Tx/Rx isolation device 1104, a low noise amplifier (LNA) 1106, a pulse demodulator 1108, a first voltage regulator 1122, a receiver baseband processing module 1110, a phase locked loop (PLL) and/or voltage controlled oscillator (VCO) 1112, a reference oscillator 1114, a transmitter baseband processing module 1116, a pulse modulator 1118, a second voltage regulator 1124, and a power amplifier (PA) 1120.

As a source communication device, data to be transmitted to a destination communication device is sent to the transmitter baseband processing module 1116. The transmitter baseband processing module 1116 processes the transmit data to generate an outbound baseband signal. The pulse modulator 1118 generates pulses (e.g., ultra wideband (UWB) pulses) based on the outbound baseband signal. The second voltage regulator 1124 supplies the charge at the proper time to the pulse modulator 1118 in order for the pulse to be generated. The PA 1120 amplifies the UWB pulses signal and provides it to the antenna 1102 via the Tx/Rx isolation device 1104 for transmission into a wireless medium. The transmit data may be generated by a sensor, a microprocessor, a microcontroller, a RISC processor, a keyboard, a pointing device such as a mouse or a track ball, an audio device, such as a headset, including a transducer such as a microphone, a medical device, a shoe, a robotic or mechanical device that generates data, a user interface, such as a touch-sensitive display, etc.

As a destination communication device, a received RF signal (e.g., inbound UWB pulses) is picked up by the antenna 1102 and applied to the LNA 1106 via the Tx/Rx isolation device 1104. The LNA 1104 amplifies the received RF signal. The pulse demodulator 1108 generates an inbound baseband signal based on the received UWB pulses. The first voltage regulator 1122 supplies the charge at the proper time to the pulse demodulator 1108 in order to properly process the pulses. The receiver baseband processing 1110 processes the incoming baseband signal to generate the received data. A data processor (not shown) may then perform one or more defined operations based on the received data. For example, the data processor may include a microprocessor, a microcontroller, a reduced instruction set computer (RISC) processor, a display, an audio device, such as a headset, including a transducer such as speakers, a medical device, a shoe, a watch, a robotic or mechanical device responsive to the data, a user interface, such as a display, one or more light emitting diodes (LED), etc.

Figure 12A:
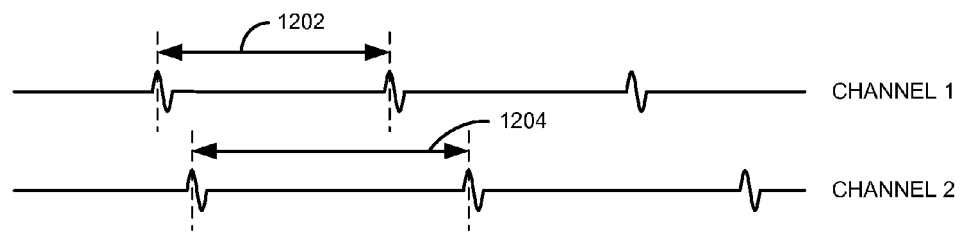
FIGS. 12A-D illustrate timing diagrams of various pulse modulation techniques in accordance with another aspect of the disclosure.

FIG. 12A illustrates different channels (channels 1 and 2) defined with different pulse repetition frequencies (PRF) as an example of a pulse modulation that may be employed in any of the communications systems, devices, and apparatuses described herein. Specifically, pulses for channel 1 have a pulse repetition frequency (PRF) corresponding to a pulse-to-pulse delay period 1202. Conversely, pulses for channel 2 have a pulse repetition frequency (PRF) corresponding to a pulse-to-pulse delay period 1204. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF)). Conversely, a channel supporting relatively high data rates (e.g., on the order of a several megabits per second or Mbps) may employ a correspondingly higher pulse repetition frequency (PRF).

Figure 12B:
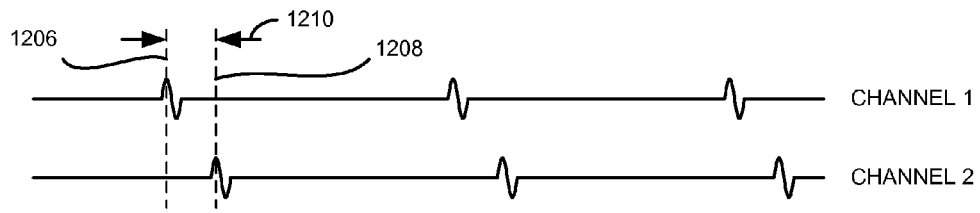

FIG. 12B illustrates different channels (channels 1 and 2) defined with different pulse positions or offsets as an example of a modulation that may be employed in any of the communications systems described herein. Pulses for channel 1 are generated at a point in time as represented by line 1206 in accordance with a first pulse offset (e.g., with respect to a given point in time, not shown). Conversely, pulses for channel 2 are generated at a point in time as represented by line 1208 in accordance with a second pulse offset. Given the pulse offset difference between the pulses (as represented by the arrows 1210), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 12C:
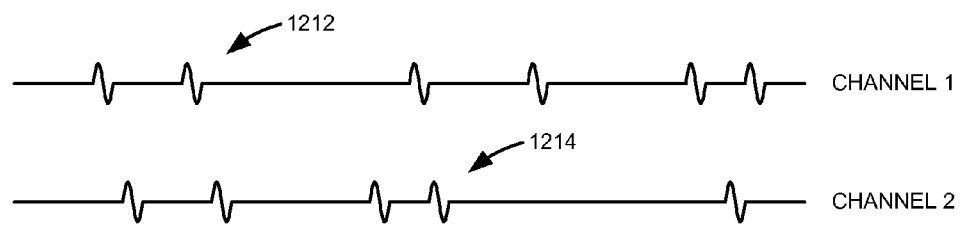

FIG. 12C illustrates different channels (channels 1 and 2) defined with different timing hopping sequences modulation that may be employed in any of the communications systems described herein. For example, pulses 1212 for channel 1 may be generated at times in accordance with one time hopping sequence while pulses 1214 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 12D:
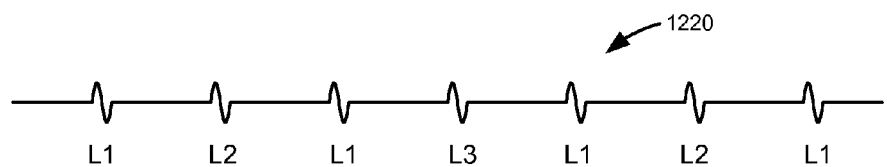

FIG. 12D illustrates different channels defined with different time slots as an example of a pulse modulation that may be employed in any of the communications systems described herein. Pulses for channel L1 are generated at particular time instances. Similarly, pulses for channel L2 are generated at other time instances. In the same manner, pulse for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

FIG. 13 illustrates a block diagram of various ultra-wide band (UWB) communications devices communicating with each other via various channels in accordance with another aspect of the disclosure. For example, UWB device 1 1302 is communicating with UWB device 2 1304 via two concurrent UWB channels 1 and 2. UWB device 1302 is communicating with UWB device 3 1306 via a single channel 3. And, UWB device 3 1306 is, in turn, communicating with UWB device 4 1308 via a single channel 4. Other configurations are possible. The communications devices may be used for many different applications, and may be implemented, for example, in a headset, microphone, biometric sensor, heart rate monitor, pedometer, EKG device, watch, shoe, remote control, switch, tire pressure monitor, or other communications devices. A medical device may include smart band-aid, sensors, vital sign monitors, and others. The communications devices described herein may be used in any type of sensing application, such as for sensing automotive, athletic, and physiological (medical) responses.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus for supplying power to a load, comprising:
    a first switching element;
    a first circuit adapted to transfer charge at a first voltage to the load by way of the first switching element, wherein the first circuit comprises a first capacitive element or an inductive element;
    a second switching element;
    a second circuit adapted to replenish the charge depleted from the first circuit by way of the second switching element, wherein the second circuit is charged at a second voltage greater than the first voltage so as to achieve a defined rate of charge replenishment, wherein the second circuit comprises a second capacitive element;
    a third switching element;
    a voltage source configured to supply the charge to the second circuit by way of the third switching element; and
    a controller adapted to control the first, second, and third switching elements in a defined timing relationship based on the first voltage.

2. The apparatus of claim 1, wherein the first capacitive element includes a capacitance sufficient to maintain the first voltage within a defined specification.

3. The apparatus of claim 1, further comprising a compensator adapted to change a capacitance of the second capacitive element as a function of the first voltage.

4. The apparatus of claim 1, wherein the second capacitive element includes a capacitance that is sufficient to substantially replenish all the charge depleted from the first circuit.

5. The apparatus of claim 1, further comprising a compensator adapted to control an amount of charge transferred from the second circuit to the first circuit to maintain the first voltage within a defined specification.

6. The apparatus of claim 1, wherein a capacitance of the second capacitive element is greater than a capacitance of the first capacitive element.

7. The apparatus of claim 1, wherein the controller is adapted to control the first and second switching elements in the defined timing relationship to transfer the charge from the first circuit to the load at a different time interval as the replenishment of the charge depleted from the first circuit.

8. The apparatus of claim 1, wherein the controller is adapted to control the first and second switching elements in the defined timing relationship to transfer the charge from the first circuit to the load at substantially a same time interval as the replenishment of the charge depleted from the first circuit.

9. The apparatus of claim 1, wherein the second capacitive element comprises a capacitor, a capacitor bank, or a varactor.

10. The apparatus of claim 1, wherein the voltage source comprises a battery.

11. The apparatus of claim 1, wherein the controller, in accordance with the defined timing relationship, is adapted to:
    control the first switching element to couple the first circuit to the load during the first time interval to transfer charge to the load;
    control the second switching element to decouple the second circuit from the first circuit during the first time interval; and control the third switching element to couple the voltage source to the second circuit during the first time interval to form charge on the first capacitive element.

12. The apparatus of claim 11, wherein the controller, in accordance with the defined timing relationship, is further adapted to:
control the first switching element to decouple the first circuit from the load during the second time interval;
control the second switching element to couple the second circuit to the first circuit during the second time interval to replenish charge depleted from the first circuit during the first time interval; and
control the third switching element to decouple the voltage source from the second circuit during the second time interval.

13. The apparatus of claim 1, wherein the controller, in accordance with the defined timing relationship, is adapted to control the first, second, and third switching elements to confine the first voltage to a defined voltage ripple.

14. The apparatus of claim 1, further comprising a compensator adapted to generate a signal based on the first voltage, wherein the controller is further adapted to control the second switching element based on the signal.

15. The apparatus of claim 1, further comprising a compensator adapted to generate a signal based on the first voltage, wherein the controller is further adapted to control an output of the voltage source based on the signal.

16. The apparatus of claim 1, further comprising:
a variable resistor coupled between the second circuit and the first circuit; and
a compensator adapted to generate a signal based on the first voltage, wherein the controller is further adapted to control a resistance of the variable resistor based on the signal.

17. A method for supplying power to a load, comprising:
transferring charge at a first voltage from a first node to the load during a first time interval;
replenishing charge depleted from the first node by transferring charge at a second voltage from a second node to the first node during a second time interval, wherein the second voltage is greater than the first voltage so as to achieve a defined rate of charge replenishment, and wherein transferring charge from the second node to the first node comprises discharging a first capacitive element; and
applying a voltage to the first capacitive element during a third time interval in order to generate the charge transferred from the second node to the first node; and
establishing a defined timing relationship between the first, second and third time intervals based on the first voltage.

18. The method of claim 17, wherein transferring charge from the first node to the load comprises discharging a second capacitive element, and wherein the second capacitive element comprises a dielectric material interposed between two electrodes.

19. The method of claim 18, further comprising configuring a capacitance of the second capacitive element to maintain the first voltage within a defined specification.

20. The method of claim 17, further comprising adjusting a capacitance of the first capacitive element as a function of the first voltage.

21. The method of claim 17, further comprising configuring a capacitance of the first capacitive element to substantially replenish all the charge depleted from the first node.

22. The method of claim 17, further comprising controlling an amount of charge transferred from the second node to the first node to maintain the first voltage within a defined specification.

23. The method of claim 17, wherein transferring charge from the first node to the load comprises releasing energy from an energy storage element.

24. The method of claim 23, wherein transferring charge from the first node to the load comprises releasing energy from an inductive element.

25. The method of claim 17, wherein transferring charge from the second node to the first node comprises discharging the first capacitive element, wherein transferring charge from the first node to the load comprises discharging a second capacitive element, and further wherein the first capacitive element includes a first capacitance that is greater than a second capacitance of the second capacitive element.

26. The method of claim 17, wherein the first time interval does not overlap with the second time interval in accordance with the defined timing relationship.

27. The method of claim 17, wherein the first time interval partially overlaps with the second time interval in accordance with the defined timing relationship.

28. An apparatus for supplying power to a load, comprising:
means for transferring charge at a first voltage to the load during a first time interval; and
means for replenishing the charge depleted from the charge transferring means during a second time interval, wherein the charge replenishing means is charged at a second voltage greater than the first voltage so as to achieve a defined rate of charge replenishment, and further wherein the charge replenishing means comprises a first capacitive element; and
means for applying a voltage to the first capacitive element during a third time interval in order to generate the charge transferred from the charge replenishing means to the charge transferring means; and
means for establishing a defined timing relationship between the first, second and third time intervals based on the first voltage.

29. The apparatus of claim 28, wherein the charge transferring means comprises a second capacitive element, and wherein the second capacitive element comprises a dielectric material interposed between two electrodes.

30. The apparatus of claim 29, wherein the second capacitive element includes a capacitance sufficient to maintain the first voltage within a defined specification.

31. The apparatus of claim 28, further comprising means for adjusting a capacitance of the first capacitive element as a function of the first voltage.

32. The apparatus of claim 28, wherein the first capacitive element includes a capacitance that is sufficient to substantially replenish all the charge depleted from the charge transferring means.

33. The apparatus of claim 28, further comprising means for controlling an amount of charge transferred from the charge replenishing means to the charge transferring means to maintain the first voltage within a defined specification.

34. The apparatus of claim 28, wherein the charge transferring means comprises a means for storing energy.

35. The apparatus of claim 34, wherein the energy storage means comprises an inductive element.

36. The apparatus of claim 28, wherein the first capacitive element includes a first capacitance, wherein the charge transferring means comprises a second capacitive element including a second capacitance, and further wherein the first capacitance is greater than the second capacitance.

37. The apparatus of claim 28, wherein the first time interval does not overlap with the second time interval in accordance with the defined timing relationship.

38. The apparatus of claim 28, wherein the first time interval partially overlaps with the second time interval in accordance with the defined timing relationship.

39. A computer program product for supplying power to a load, comprising:
   a computer readable medium comprising instructions executable to:
      transfer charge at a first voltage from a first node to the load during a first time interval; and
      replenish charge depleted from the first node by transferring charge at a second voltage from a second node to the first node during a second time interval, wherein the second voltage is greater than the first voltage so as to achieve a defined rate of charge replenishment, and further wherein the transfer of charge from the second node to the first node comprises discharging a capacitive element;
      apply a voltage to the first capacitive element during a third time interval in order to generate the charge transferred from the second node to the first node; and
      establish a defined timing relationship between the first, second and third time intervals based on the first voltage.

40. A headset, comprising:
   a transmitter adapted to transmit audio data;
   a first switching element;
   a first circuit adapted to transfer charge at a first voltage to the transmitter by way of the first switching element, wherein the first circuit comprises a first capacitive element or an inductive element;
   a second switching element;
   a second circuit adapted to replenish the charge depleted from the first circuit by way of the second switching element, wherein the second circuit is charged at a second voltage greater than the first voltage so as to achieve a defined rate of charge replenishment, wherein the second circuit comprises a second capacitive element;
   a third switching element;
   a voltage source configured to supply the charge to the second circuit by way of the third switching element; and
   a controller adapted to control the first, second, and third switching elements in a defined timing relationship based on the first voltage.

41. A watch, comprising:
   a receiver adapted to receive data;
   a user interface adapted to generate an indication based on the received data;
   a first switching element;
   a first circuit adapted to transfer charge at a first voltage to the receiver by way of the first switching element, wherein the first circuit comprises a first capacitive element or an inductive element;
   a second switching element;
   a second circuit adapted to replenish the charge depleted from the first circuit by way of the second switching element, wherein the second circuit is charged at a second voltage greater than the first voltage so as to achieve a defined rate of charge replenishment, wherein the second circuit comprises a second capacitive element;
   a third switching element;
   a voltage source configured to supply the charge to the second circuit by way of the third switching element; and
   a controller adapted to control the first, second, and third switching elements in a defined timing relationship based on the first voltage.

42. A sensing device, comprising:
   a sensor adapted to generate sensed data;
   a transmitter adapted to transmit the sensed data;
   a first switching element;
   a first circuit adapted to transfer charge at a first voltage to the transmitter by way of the first switching element, wherein the first circuit comprises a first capacitive element or an inductive element;
   a second switching element;
   a second circuit adapted to replenish the charge depleted from the first circuit by way of the second switching element, wherein the second circuit is charged at a second voltage greater than the first voltage so as to achieve a defined rate of charge replenishment, wherein the second circuit comprises a second capacitive element;
   a third switching element;
   a voltage source configured to supply the charge to the second circuit by way of the third switching element; and
   a controller adapted to control the first, second, and third switching elements in a defined timing relationship based on the first voltage.

* * * * *